Sept. 18, 1928.
O. LARSEN
1,684,835
FLOW REGULATOR
Filed July 9, 1926
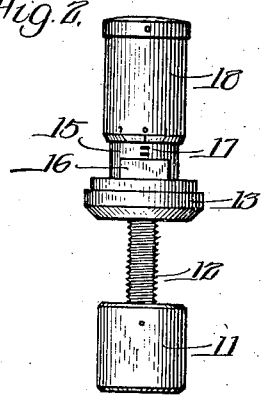
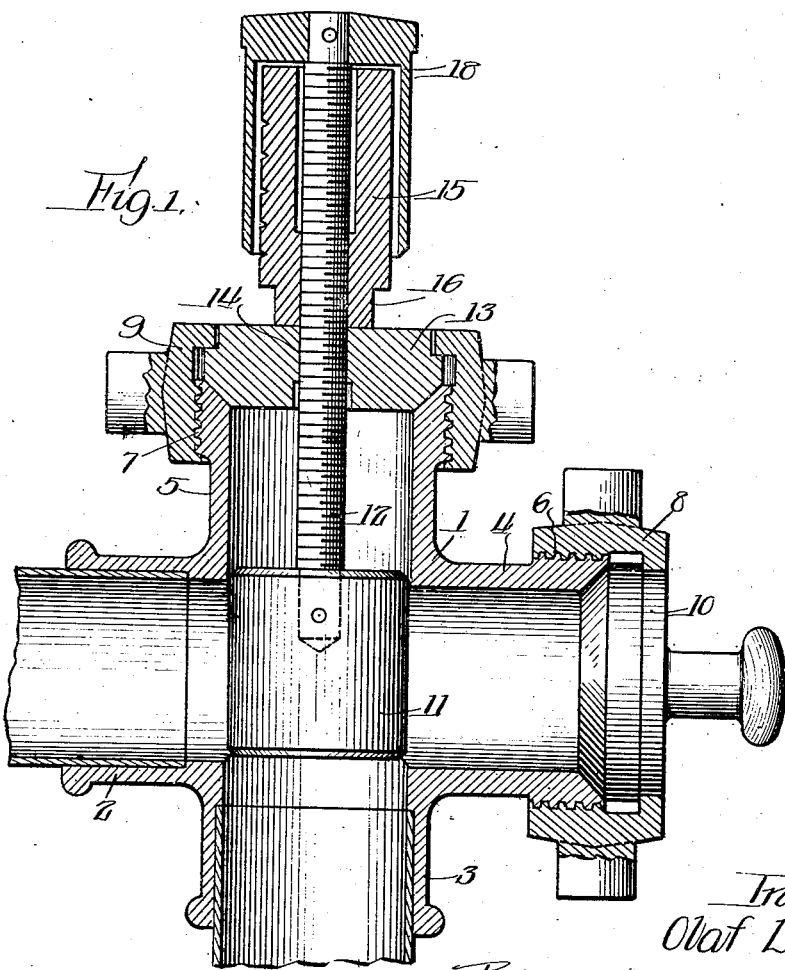
Inventor
Olaf Larsen Patented Sept. 18, 1928.

1,684,835

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

FLOW REGULATOR.

Application filed July 9, 1926. Serial No. 121,294.

The invention relates to regulators for the control of the flow of liquid in pipe lines, and more particularly relates to the control of flowing milk in sanitary piping.

In the handling of milk in dairy plants, the several steps of the preparation of the milk for food consumption requires the movement of the liquid from one apparatus to another which is commonly accomplished by pumping the milk through sanitary pipe lines or in arranging for the gravity flow of the liquid from one apparatus to another. It is necessary to regulate the flowing liquid in the piping to prevent the over accumulation of the milk in the containers employed at the several stages of treatment.

It is the principal object of this invention to provide an improved device for the regulation of the flow of liquid in pipe lines. A further object is to provide a device of this character, which is readily adaptable for installation in the standard fittings commonly used in sanitary piping, and which may be readily disassembled therefrom for cleaning and sterilizing after use.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings, Fig. 1 is a sectional elevation of the device illustrated as installed in what is commonly known as a cleanout L fitting for sanitary piping. Fig. 2 is a reduced full view in elevation of the detached device. In the drawings the numeral 1 represents the structure of a clean-out L, having branch extensions 2 and 3 for the connection of sanitary piping, and having the clean-out extensions 4 and 5 in continuance respectively of the extensions 2 and 3. The clean-out extensions 4 and 5 are provided with screw threads 6 and 7, by which the unions 8 and 9 are removably secured thereto and hold in place closure plugs, as indicated at 10 in the extension 4.

In the extension 5 the usual closure plug is displaced for the introduction of my device. The latter comprises a plunger 11, of suitable dimensions to operatively enter the passage in the extension of the fitting and to be positioned at the junction of the flow passages, thereby effecting the control of the flow through the latter passages by the movement of the plunger 11, across the interception of the flow passages and within the passage in the cleanout extension 5. The plunger 11 is supported and operatively controlled by means of a screw 12 secured at one end of the plunger and extending outwardly of the fitting extension 5. A cap 13 is stationarily secured at the end of the fitting extension 5 by means of the union 9, the cap having a screw threaded aperture 14 therethrough, through which the screw 12 extends in operative threaded engagement.

Outwardly of the cap 13, a sleeve nut 15 is mounted on the screw 12 in threaded engagement therewith, and having its portion adjacent to the cap 13 suitably flattened as at 16, for the application of a wrench to turn it against the cap and lock the screw in its adjusted or selected relation to the cap. The sleeve extension of the nut 15 may be marked with graduations, as illustrated at 17, to assist in the repeated setting of the device to control a predetermined rate of flow through the fitting. A ferrule 18 is securely attached at the outer end of the screw 12 and extending in overlying operative relation to the sleeve nut 15, the inner margin of the ferrule serving with the graduations 17 to determine the position of the plunger in relation to the flow passages, and the ferrule as a whole when in upright position protecting the sleeve nut and screw from the entry of liquid therebetween.

In operation, the device as installed in its suitable fitting, and with the sleeve nut 15 turned out of engagement with the cap 13, the plunger 11 may be positioned to control the liquid to the desired rate of flow through the fitting, whereupon the sleeve nut 15 is turned into locking engagement with the cap 13. With the removal of the union 9 the device may be entirely withdrawn to permit the cleaning of the pipe lines and of the device itself.

I claim as my invention:

1. A device of the class described, comprising a plunger adapted for operative association with a casing having a plurality of intercepting passages and to be positioned at the junction of said passages, said plunger being movable in one of said passages to control the flow of liquid between other of said passages at said junction, a screw supporting said plunger and adapted to extend endwardly outward of the passage in which said plunger is movable, a cap adapted to be stationarily supported at the end of said latter passage, said screw extending through said cap in threaded engagement therewith, a sleeve nut threaded on said screw for outward abutment with said cap, and a ferrule fixed on said screw outwardly of said nut, said ferrule extending in overlying operative relation to said sleeve nut.

2. A device of the class described comprising in combination, a casing having a plurality of intercepting passages, a plunger adapted to be positioned at the junction of said passages and movable in one of said passages to control the flow of fluid through other of said passages at said junction, a stem supporting said plunger and extending endwardly outward of the passage in which said plunger is movable, a cap stationarily supported at the end of said latter passage, said stem extending through said cap in threaded engagement therewith, a sleeve axially positioned about and threaded on said stem and adapted to have outward abutment with said cap, and a ferrule fixed on said stem outwardly of said sleeve, said ferrule extending in over-lying operative relation to said sleeve.

In witness whereof I have hereunto attached my signature.

OLAF LARSEN.